(12) United States Patent
Kordonowy

(10) Patent No.: US 8,355,830 B2
(45) Date of Patent: Jan. 15, 2013

(54) AIRCRAFT HEALTH MONITORING AND DESIGN FOR CONDITION

(75) Inventor: David Kordonowy, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 292 days.

(21) Appl. No.: 12/750,282

(22) Filed: Mar. 30, 2010

(65) Prior Publication Data

US 2011/0245999 A1 Oct. 6, 2011

(51) Int. Cl.
*G06F 17/00* (2006.01)
(52) U.S. Cl. .......................................................... 701/3
(58) Field of Classification Search ........................ 701/3
See application file for complete search history.

(56) References Cited

U.S. PATENT DOCUMENTS

| | | | | |
|---|---|---|---|---|
| 6,072,467 | A * | 6/2000 | Walker | 345/157 |
| 7,373,260 | B2 * | 5/2008 | Kessler et al. | 702/35 |
| 2006/0069520 | A1 * | 3/2006 | Gorinevsky et al. | 702/36 |

* cited by examiner

*Primary Examiner* — Thomas Tarcza
*Assistant Examiner* — Maceeh Anwari
(74) *Attorney, Agent, or Firm* — Katten Muchin Rosenman LLP

(57) ABSTRACT

A system and method for automatically varying the flight envelope of an aircraft based upon the material health of the aircraft and the flight environment is provided. The system includes a plurality of structural health monitoring and load sensors that determine the approximate size and the approximate location of the damage. The system performs residual strength calculations for individual aircraft components to determine the overall aircraft residual strength. The system uses these calculations to determine a maximum flight envelope based on the overall aircraft residual strength, and transmits this information to the flight controller and optionally to the pilot.

22 Claims, 5 Drawing Sheets

AIRCRAFT HEALTH MONITORING AND DESIGN FOR CONDITION

BACKGROUND OF THE INVENTION

1. Field of the Invention

The present invention relates to prognostic health of aircraft. More particularly, the present invention relates to automatically detecting and evaluating residual strength of aircraft, especially those that are manufactured using advanced composite materials, and adapting their flight based upon their health condition.

2. Related Art

Today's advanced airborne weapons systems push the limits of technology to achieve greater speed, payload, and efficiency than previous generation systems. As a result of the use of advanced composite materials, performance has increased significantly. The tradeoff for the improved performance from composites is that when the aircraft are on the ground and in between sorties, advanced systems and structures require extensive maintenance, including detailed inspections to ensure light weight-critical structures enabled by composites have not been damaged. To achieve aggressive cost and manpower savings on next generation platforms, composite structures must be designed to be capable of monitoring their own health and adapting their flight based upon their health condition. Similarly, the technology is equally applicable to commercial aircraft.

While an onboard health monitoring system that performs diagnostic inspections on airframes has been shown to be feasible through test and demonstration, there remains a need for a system that can adapt the performance of the aircraft to the diagnostic information obtained by the onboard health monitoring system.

SUMMARY OF THE INVENTION

In one aspect, the invention provides a monitor system for determining a residual strength of an aircraft, the aircraft comprising a plurality of panels. The system comprises a plurality of sensors mounted on a first panel and a microprocessor in communication with each of the plurality of sensors. Each of the plurality of sensors is configured to detect time domain data, frequency domain data, and energy domain data, and to transmit the detected data to the microprocessor. The microprocessor is configured to process the detected data and, when the first panel has been damaged, to use the processed data to determine an approximate size of the damage and an approximate location of the damage, and to use the determinations to determine an aircraft residual strength and a flight loading for which the determined aircraft residual strength allows. The first panel may include at least one sensor per three square feet of first panel surface area.

The monitor system may further comprise a flight control subsystem, the flight control subsystem being in communication with the microprocessor. The microprocessor may be further configured to communicate the processed data to the flight control subsystem. The flight control subsystem may be configured to use the received data to limit a maneuverability of the aircraft. The microprocessor may be further configured to use the processed data to determine that a specific maintenance action should be taken to address the damage.

Each of the plurality of sensors may be further configured to emit an acoustic wave signal and to receive a wave return signal corresponding to the emitted signal, and to measure an amplitude, a frequency, and a phase of the received wave return signal. The microprocessor may be further configured to process the detected data by using at least one of a guided wave (GW) method, an acoustic emission (AE) method, and a frequency response (FR) method.

For each of the plurality of sensors, the detected time domain data may include a set of measurements of differences between a time at which each acoustic wave signal is emitted and a time at which each respective corresponding wave return signal is received. For each of the plurality of sensors, the detected frequency domain data may include at least one of a data set selected from the group consisting of a set of measurements of frequency shifts between a frequency at which each acoustic wave signal is emitted and a frequency at which each respective corresponding wave return signal is received, a phase at which each acoustic wave signal is emitted and a phase at which each respective corresponding wave return signal is received, and a power spectral density data set. For each of the plurality of sensors, the detected energy domain data may include at least one of a data set selected from the group consisting of a set of measurements of amplitude shifts between an amplitude at which each acoustic wave signal is emitted and an amplitude at which each respective corresponding wave return signal is received, a mean amplitude shift, and a standard deviation of amplitude shift.

The microprocessor may be further configured to store a baseline data set, the baseline data set including sensor data obtained when the first panel included no damage. The microprocessor may be further configured to determine that the first panel has been damaged when an average difference between newly received data and baseline data exceeds a first predetermined threshold. When the microprocessor determines that the first panel has been damaged, the microprocessor may be further configured to determine an approximate size of the damage and an approximate location of the damage by using at least one algorithm selected from the group consisting of a balanced one-way Analysis of Variances (ANOVA) algorithm, a Principal Components Analysis (PCA) algorithm, and a Pattern Recognition (PR) algorithm. The microprocessor may be further configured to use a K-Nearest Neighbor (KNN) pattern recognition algorithm.

In another aspect, the invention provides a method for determining a residual strength of an aircraft. The aircraft comprises a plurality of panels, each of the plurality of panels having a plurality of sensors mounted thereon. The method comprises the steps of: using each of the plurality of sensors to detect time domain data, frequency domain data, and energy domain data; transmitting the detected data to a microprocessor; using the microprocessor to process the detected data; and, when a panel has been damaged, using the processed data to determine an approximate size of the damage and an approximate location of the damage, and using the determinations to determine an aircraft residual strength and a flight loading for which the determined aircraft residual strength allows. Each panel may include at least one sensor per three square feet of panel surface area.

The method may further comprise the step of using the processed data to limit a maneuverability of the aircraft. The method may further comprise the step of using the processed data to determine that a specific maintenance action should be taken to address the damage.

The step of using each of the plurality of sensors to detect time domain data, frequency domain data, and energy domain data may further comprise using each of the plurality of sensors to emit an acoustic wave signal and to receive a wave return signal corresponding to the emitted signal, and to measure an amplitude, a frequency, and a phase of the received wave return signal. The step of using the microprocessor to process the detected data may further comprise using at least one of a guided wave (GW) method, an acoustic emission (AE) method, and a frequency response (FR) method.

For each of the plurality of sensors, the detected time domain data may include a set of measurements of differences between a time at which each acoustic wave signal is emitted and a time at which each respective corresponding wave return signal is received. For each of the plurality of sensors, the detected frequency domain data may include at least one of a data set selected from the group consisting of a set of measurements of frequency shifts between a frequency at which each acoustic wave signal is emitted and a frequency at which each respective corresponding wave return signal is received, a phase at which each acoustic wave signal is emitted and a phase at which each respective corresponding wave return signal is received, and a power spectral density data set. For each of the plurality of sensors, the detected energy domain data may include at least one of a data set selected from the group consisting of a set of measurements of amplitude shifts between an amplitude at which each acoustic wave signal is emitted and an amplitude at which each respective corresponding wave return signal is received, a mean amplitude shift, and a standard deviation of amplitude shift.

The method may further comprise the steps of using the microprocessor to store a baseline data set for each panel, the baseline data set including sensor data obtained when the respective panel included no damage, and using the microprocessor to determine that the respective panel has been damaged when an average difference between newly received data and baseline data exceeds a first predetermined threshold. When the microprocessor determines that the respective panel has been damaged, the step of using the microprocessor to determine an approximate size of the damage and an approximate location of the damage further comprises using at least one algorithm selected from the group consisting of a balanced one-way Analysis of Variances (ANOVA) algorithm, a Principal Components Analysis (PCA) algorithm, and a Pattern Recognition (PR) algorithm. The method may further comprise the step of using a K-Nearest Neighbor (KNN) pattern recognition algorithm.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE INVENTION

Figure 1:
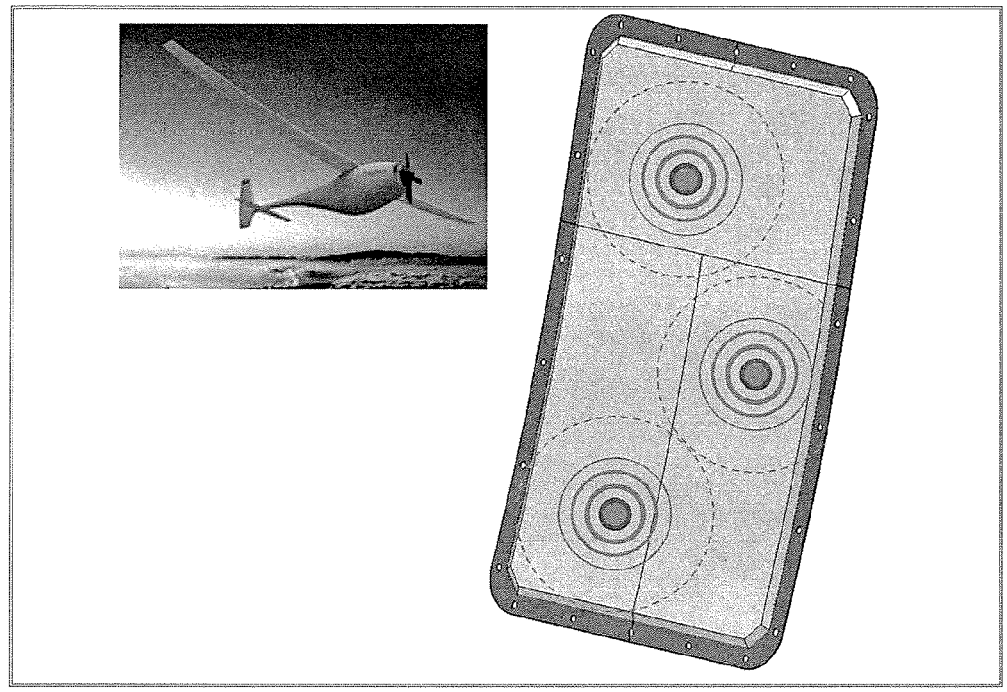
FIG. 1 illustrates an exemplary sensor placement for an aircraft health and damage monitoring system according to a preferred embodiment of the present invention.

In a preferred embodiment of the present invention, a structural health monitoring (SHM) system for aircraft manufactured using advanced composite materials system based on an active SHM sensor is provided. Referring to FIG. 1, in one exemplary embodiment, the SHM system is designed for use in conjunction with the Aurora Flight Sciences Orion vehicle. Prognostic information provided by the active SHM sensors allows the Orion vehicle to alter its flight envelope based upon the residual strength of the vehicle. The residual strength of the vehicle is determined through SHM sensors mounted on components, which transmit damage and residual strength states to a microprocessor, which, in turn, transmits flight envelope information to a flight controller.

Structural Health Monitoring sensors placed on composite panels throughout the airframe provide damage and residual strength states of the components throughout the aircraft. A remote data collection system processes the airframe health status and compares it to flight loading information to determine the ability of the aircraft to perform under current and projected flight loads. Additionally, the data provided by SHM can be compared to databases of known flaws and damage, and cross-referenced to the structural analysis of the airframe, can ultimately be used to determine the type of damage, severity of damage, and residual strength of the component. For non-critical damage sites that do not inhibit the performance of the vehicle, the overall residual strength of the aircraft remains at a level equal to the residual strength without the non-critical damage, and therefore, the flight envelope can remain at a level equal to the level used prior to the incidence of the non-critical damage. The microprocessor may be configured to further monitor the non-critical damage site for further damage at a higher rate of data sampling. The microprocessor may be configured to transmit data relating to non-critical damage sites to the flight controller or other aircraft or ground control station.

The integration of SHM sensors onto air vehicles allows for a shift in the design of air vehicles. First, SHM decreases the need for components and assemblies to be designed with access points to facilitate inspections throughout the airframe, keeping only access to areas requiring routine maintenance. Second, remote sensors allow areas that are currently inaccessible to inspection to be designed without the need for constant replacement without inspection or over-design to curtail maintenance requirements. By utilizing remote inspections, the airframe designer can create unitized structures that are more light-weight, less costly, and more quickly assembled than before, reducing the number of access panels and accessibility features currently required to inspect the air vehicle.

SHM sensors, along with Health and Usage Monitoring Systems (HUMS), allow for complete monitoring of aircraft load and health states in-situ. Air vehicles, with control systems linked to the continuous monitoring of external events and airframe residual strength, can tailor the flight environment of the air vehicle to match the current structural capability. The air vehicle can be pushed harder while undamaged and operated safely as the structure degrades due to gradual deterioration or is damaged by events. By creating a system that can "feel" and react, the airframe can operate based on real events and aircraft condition rather than estimated design limits.

An important technical objective of the present invention is to provide the weapon systems maintenance crews with the ability to inspect and evaluate the structural integrity of the airframe components in a cost efficient way while maintaining accuracy. A significant portion of the maintenance effort involves inspecting, assessing and replacing structural components that undergo severe vibration and hygrothermal load cycles.

The ability to utilize structural health monitoring (SHM) devices to detect incipient damage in composite components allows for a reduction in the traditional non-destructive evaluation (NDE) that must be performed at intervals on an aircraft. SHM devices also increase the scope of components that can be inspected without extensive removal of panels and components from a few accessible areas to virtually all components and areas of the aircraft.

The non-destructive evaluation (NDE) allows for the identification, including classification and location, of incipient damage on the component. Manufacturing defects such as inclusion of foreign objects (such as backing material) and incorrect manufacturing techniques are included in the representative parts. Incorrect manufacturing techniques, including poor ply application, debulking and bagging techniques, result in defects such as bridging, porosity and delamination areas.

In a preferred embodiment of the present invention, the structural health monitoring system is integrated onto representative panels at locations optimized to detect incipient damage over the entirety of the panel with the least number of sensors and minimum weight impact to the structure. The sensors are calibrated to detect incipient damage created during the manufacturing of the panel as well as damage developed over the life of the panel. The sensor system is designed so that it does not impede the performance of the panel and so that it operates after undergoing exposure to the environments used in the design of the aircraft platform.

In a preferred embodiment of the invention, an initial baseline set up involves the following procedure: Manufacturing flaws are embedded in two or more representative panels at various locations along the panel for the SHM system to measure. One or more defect-free panel with no manufacturing flaws are manufactured from which to create a baseline for the SHM system. All panels are scanned using industry standard NDE equipment. For each panel, the SHM system identification of damage and location is linked to the scanned panel data of that panel to form a damage detection database based on verified damage locations. The other damaged panel or panels are used to expand or validate the damage detection database created.

In a preferred embodiment of the present invention, SHM system algorithm parameters that affect the measurement of damage size and location are determined and optimization strategies for sensor placement on part geometries are created. Additionally, risk factors associated with using SHM sensors in lieu of standard NDE equipment are identified, along with associated mitigation strategies. Sensor reliability and failure analysis are conducted to ensure robust operation of the SHM system both in-situ and post-operation.

In a preferred embodiment of the invention, a representative test panel or panels are selected to have features applicable to common composite parts including core with ramps, material and core splices, and inserts. Panels are manufactured with and without embedded manufacturing flaws, and damage sites will be located to input micro cracks, delamination, and Barely Visible Impact Damage (BVID) onto areas of the panel. The panels are scanned using typical NDE techniques to determine exact size and locations of damage.

In a preferred embodiment of the invention, the test panel or panels are instrumented with SHM sensors from Metis Design Corporation, and the results of SHM sensor scans are correlated to the damage detected by standard NDE techniques to create a database of damage size and location. These sensors may be used to detect incipient damage. SHM sensors can then be used on a panel with unknown flaws to determine if and where any damage exists. It is noted that other sensor types may be used.

To resolve issues relating to continuous monitoring of wide-area aerospace composites, the Metis Design Corporation (MDC) has developed an efficient, low-mass SHM architecture known as the Intelli-Connector™ The Intelli-Connector™ is a digital sensor infrastructure—a direct replacement of traditional instrumentation such as oscilloscopes and function generators. This device greatly reduces cable weight by allowing data to be carried over a serial sensor-bus and increases signal fidelity by digitizing at the point-of-measurement to eliminate EMI. Hardware requirements are also minimized through distributed local processing.

Three main features of the sensor response, Time, Frequency, and Energy, are used to sense imperfections in the panel. The Time Domain features are the most straightforward, showing up as peaks in the raw data, providing a "time of flight" from the sensor to an imperfection, allowing the location of a flaw to be triangulated. The maximum and secondary peaks in wave data collected by the sensor can be readily extracted from the raw data with minimal processing. Frequency Domain features include the maximum value of power spectral density (PSD), general distribution of power at various frequencies, shift in frequency response from baseline, as well as the actual frequency and phase. Frequency features can be extracted by using both Fourier transforms as well as Wavelet decomposition, where the effectiveness depends on the shape of the excitation signal. The Energy Domain features include the mean and standard deviation for the original signal amplitude as well as the $1^{st}$ and $2^{nd}$ differences of the signal amplitude. Other features of the energy domain include the total integrated signal energy, the maximum peak amplitude and the amplitude of other representative envelope locations. These features are extracted through a combination of time and frequency-based functions.

In an exemplary embodiment of the invention, system testing capabilities include guided wave (GW) methods up to 500 kHz; acoustic emission (AE) methods up to 5 MHz; and frequency response (FR) methods from 10 kHz to 10 MHz. Data acquisition characteristics include, in a preferred embodiment, six independent high-speed analog channels and eight multiplexed low-speed analog channels; a selectable sampling rate up to 50 MHz, with 12-bit native resolution and 4-bit additional oversampling; 40 MS/s arbitrary function generation with 12-bit resolution, with remote programmability up to 20 Vpp; and a 1-gigabit internal data buffer and 16 megabit on-board static flash storage. In an exemplary embodiment, the system includes a 28 VDC×30/100 mA minimum/maximum power draw, allowing for multiple devices to be daisy-chained. A controller area network (CAN) protocol is preferably used for serial communication between nodes and the hub. An RS-422 controller is used for 20-ns synchronization between nodes, plus 5 ns/m cable length. The system can support embedded algorithms, including fast Fourier transforms, feature extraction, and pattern recognition. The system preferably includes integrated on-board frequency-swept impedance measurement capability for self-health assessment. Preferably, the system also includes a built-in thermistor for local temperature measurements that can be used for signal compensation.

In a preferred embodiment of the present invention, acoustic wave signals are emitted, and the wave return signal is detected by the sensors, and then the received wave return signal is processed. In a preferred embodiment, the acoustic wave signal is a lamb wave signal. However, the invention may also advantageously use any signal type for which a return wave signal can be processed by the sensor. In a preferred embodiment, the sensor is a piezoelectric actuator. However, the invention may also advantageously use other types of sensors, such as laser spectrometers or x-ray devices.

Once a set of feature is identified, the next step is to select from the set which features are most representative and discriminative. Using a larger feature set for analysis may not necessarily imply better classification. Often a larger feature set requires larger training data sets for error convergence and may otherwise degrade the performance of the classification method. There are many ways to select features, which can produce results with varying accuracy and efficiency.

The most traditional method is a balanced one-way Analysis of Variances (ANOVA). This is accomplished by simply comparing the means of two or more columns of data from various training states and selecting features based on the probability value of the null hypothesis that a given feature remains the same for all categories of damaged and undamaged plates. An efficient feature reduction method, Principal Components Analysis (PCA), is a multi-disciplinary technique used for reducing dimensionality of a given dataset. In this technique, the natural coordinate systems of the data, such as voltage versus time or intensity versus frequency, are transformed such that the greatest variance is captured by the first coordinate (first principal component), the second greatest variance by the second coordinate, etc. Principal components that encapsulate most variability can then be selected and be used to reconstruct data with low-order dimensionality, while the remaining components are discarded. The first step of PCA is to compute the co-variance of n-dimensional data. This is followed by finding the eigenvectors (U) and eigenvalues of the co-variance matrix ($\lambda$). Next the n eigenvectors correspond to a new set of orthogonal vectors and the corresponding eigenvalue is proportional to the variance captured by projecting along that vector. Finally, the eigenvalues are ordered, and the first k vectors are chosen to capture the desired variance.

Pattern Recognition (PR) algorithms are used to equate sensor response to damage type and location. PR algorithms are essentially a collection of mathematical models that can be used to associate a set of test data with one of several pre-designated categories. Some of these methods are purely statically-based, and others have learning capabilities, however all PR methods have a requirement for training sets to define a "profile" for each category. In a preferred embodiment of the present invention, among several different pattern recognition techniques which have been investigated to evaluate their effectiveness with regards to characterizing damage within the presented methodology, K-Nearest Neighbor (KNN) has yielded the best results. KNN is a supervised learning algorithm, in which the category of new data set is determined based on its closest neighbor. The simplest version of KNN is where K=1, and a data set is assigned to the group of the training set that most closely matches, determined by similarity of features or principal components. As K increases, the data set is assigned to the group of the majority category of K-nearest neighbors, as calculated by measuring similarity. KNN is not a true learning algorithm, but based on memory, where a new instance is determined by input features and training samples. Advantages of KNN include that it is analytically tractable, simple to implement, uses local information that can yield highly adaptive behavior and lends itself very easily to parallel implementations. The disadvantages include large storage requirements and computationally intensive recall, both of which become worse as K increases, as well as its sensitivity to noise in the data, particularly at low K values.

In a preferred embodiment of the invention, the methodology incorporates flight tailoring with structural health monitoring (SHM) to allow for maximized aircraft flight performance based upon real-time event sensing. Currently, most aircraft structure is sized to safely withstand worst-case loading using materials that incorporate worst-case flaws and/or damage states. Additionally, the material design properties are often derived from elevated-temperature high-humidity environment testing, which are less capable than the material properties under room or cold temperature and dry humidity. Much of the time, the aircraft will perform under environmental conditions that exceed the material properties to which it is designed. Vehicle design loads are treated in a similar manner with a summation of worst-case loadings sizing the aircraft. The loading is a summation of high maneuver loading combined with worst-case aerodynamic loading that includes low-probability high-amplitude gusts. These design practices make for safe flight through their conservative assumptions for any conceivable environment that the airplane might undergo (and environments that the airplane would never undergo), however they do not accurately reflect the state of the material or the loading during real-world flight.

Through the monitoring of the material health state and vehicle loading either real-time or post-operation, along with the ability to tailor the flight of the aircraft to accommodate the health state through an advanced flight control system, it is possible to create a structure that is lighter than a similar structure built using traditional design methodologies, while maintaining the safety factors and nominal flight envelope.

Figure 2:
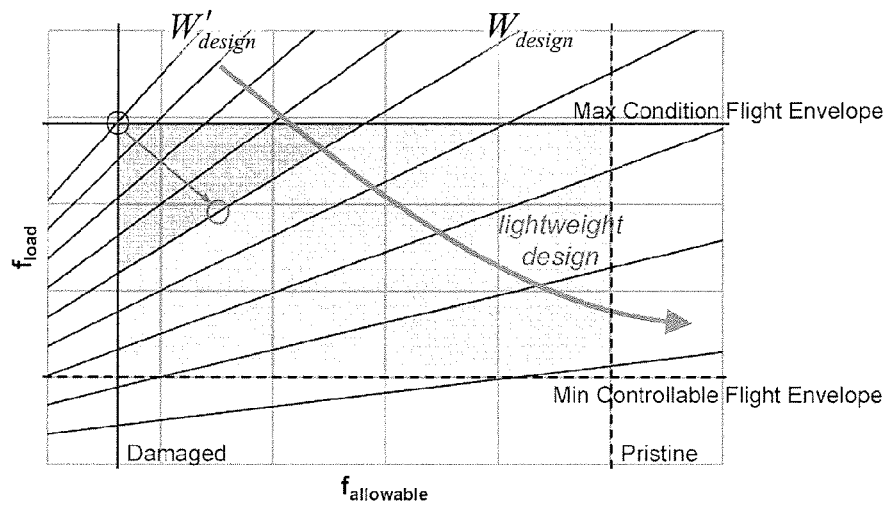
FIG. 2 illustrates a graph of a design space for an aircraft health and damage monitoring system as a function of a material health state function and a component loading function according to a preferred embodiment of the present invention.

Referring to FIG. 2, in a preferred embodiment of the invention, the design space for which the system is utilized comprises the material health state function, $f_{allowable}$, and component loading function, $f_{load}$. The function $f_{allowable}$ can be likened to the residual strength of the component, for which a given load function would compare (e.g., the residual strength of a component in bending compared to an expected bending load, or a residual stiffness of a component compared to a destabilizing load). For a given load (i.e., vehicle load) and allowable (i.e., material health state), an optimal size and weight of the component can be found. By reducing the allowable and also the load, the same size and weight of the component can be held constant. But by reducing the load and holding the allowable constant, or increasing the allowable but holding the load constant, the size and weight of the component is reduced. Thus, there exist lines, shown as increasing diagonally from left to right in FIGS. 3a and 3b, of equally sized and weighted component for given loads and allowable strength.

Currently, components are typically sized by the upper left corner of the design space: maximum condition flight envelope loading and damaged allowables. By moving the sizing to a lower weight, the component can survive maximum condition flight envelope loading under most, but not all, allowable states. As the allowable decreases, the loading that the component can withstand decreases. By measuring both the current loading and material health state, and controlling the future loading based on allowable, the design is always qualified for the now variable flight condition. There exists a lower limit for the design loading, based on the minimum controllable flight envelope, which is a function of the fight control system, load detection accuracy, and ability to fly in a reduced fashion. This ultimately creates a floor for the design, but does not impair the ability to fly under all but the most extreme material health degradation.

This benefit also addresses the safety and usefulness of the structure over time. Design of aerospace structures depends on sparse data relating the stress levels that the vehicle will experience, adjusted by factors of safety, and the predicted lifetime of the structure for repeated application of this stress level. This is the "design point"—although this point is relatively well established, it is only one point on a complex curve. In fact, the relationship between stress and lifetime is complex, because stress is accumulated stochastically during the lifetime of a structure, as limit stress, temperature, and high cycle fatigue, as well as mechanical, fastener, and adhesive wear. Nevertheless, the limit load and lifetime are set conservatively for the vehicle, and the vehicle must live within this simplified envelope for the duration of its life—this limits what the vehicle can do and makes the vehicle heavier to reach a certain level of performance.

An objective of the present invention is to enable, through direct measurement of load and structure state, the aircraft to exceed its designed end-of-life maximum load point and its designed vehicle lifetime. Exceeding the designed end-of-life maximum load point may be achieved by allowing the vehicle to perform more aggressive maneuvers, or to fly in more adverse loading conditions, while monitoring the lifetime degradation (or reducing the design structural weight) of the vehicle. Exceeding the designed vehicle lifetime may be achieved by monitoring the loads experienced by the vehicle during its life, and extending the available life if certain load levels, low cycle, or high cycle fatigue limits are not encountered.

Figure 3A:
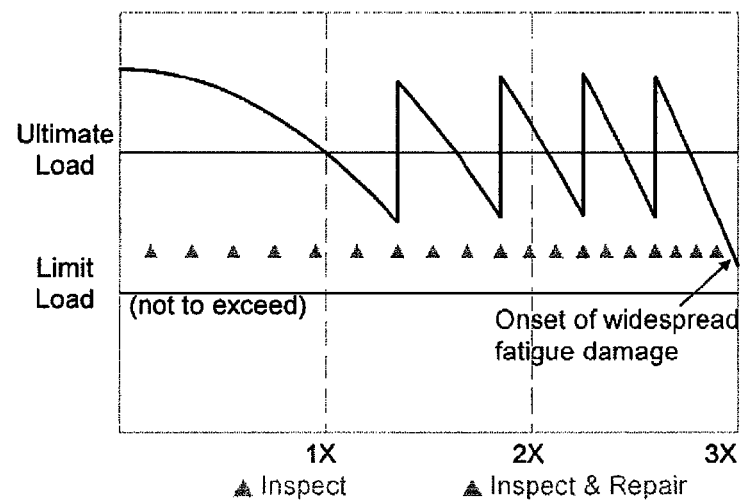
FIGS. 3a and 3b respectively illustrate inspection and repair schedules with and without the use of an aircraft health and damage monitoring system according to a preferred embodiment of the present invention.
Figure 3B:
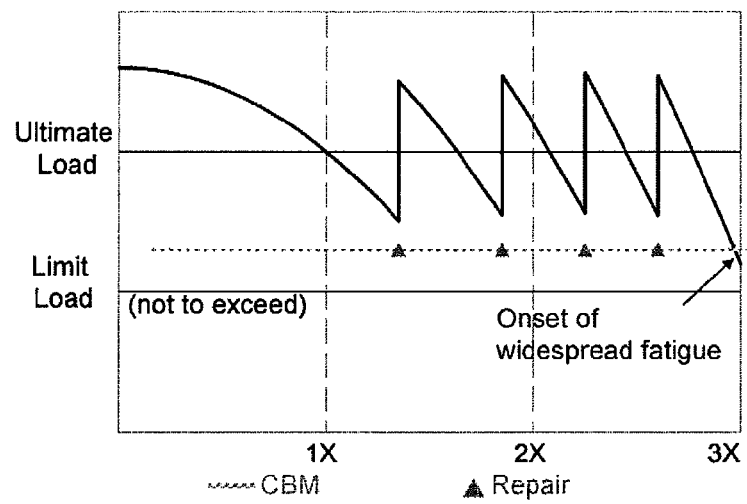

Referring to FIGS. 3a and 3b, condition-based maintenance ulitizes health monitoring to reduce the number of required aircraft inspections based on actual damage detected. In a preferred embodiment of the present invention, condition-based maintenance is achieved directly through the application of the SHM sensor system without additional sensor requirements. The condition-based maintenance methodology allows for the physical inspections performed by technicians, as indicated by triangles in FIG. 3a, to replaced by an automatic "inspection" performed by the health monitoring system at intervals set by the sensor operating frequency, which can be considered constant (as illustrated in FIG. 3b by the horizontal line with triangles indicating repairs) relative to the intervals indicated in FIG. 3a.

Figure 4A:
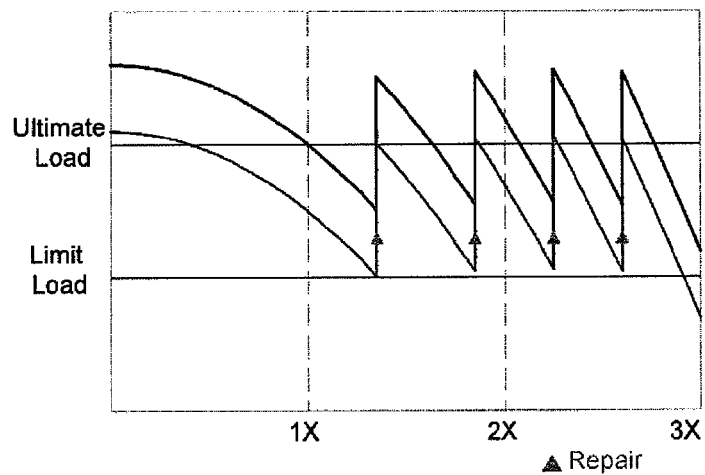
FIGS. 4a and 4b respectively illustrate a variable flight envelope and a reduced residual strength flight envelope based on determinations made by using an aircraft health and damage monitoring system according to a preferred embodiment of the present invention.

As the flight envelope defines the limit load, a higher residual strength of the aircraft above the limit load correspondingly increases the safety margin of the aircraft to the predefined flight envelope. Thus, over the service life of a typical aircraft, the safety margin fluctuates based on the residual strength of the aircraft. The minimum safety margin is met when the residual strength is closest to the limit loading, just before a repair is required. By using an aircraft health monitoring system according to a preferred embodiment of the present invention, the flight envelope can be recast to provide for a constant safety margin based upon the time-based residual strength of the aircraft. Based on a predetermined minimum safety margin, the flight envelope can be expanded from the limit load as illustrated in FIG. 4a. In this manner, the variable flight envelope is used to expand the performance of the aircraft to match the capabilities of the aircraft.

Figure 4B:
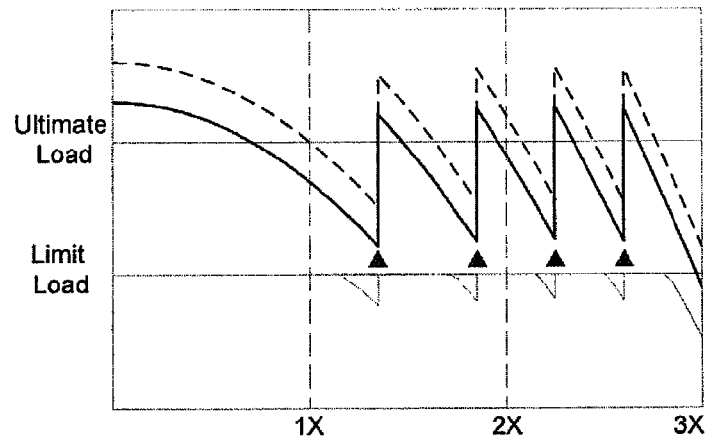

A variable flight envelope can also be used to reduce the weight of the aircraft by reducing the capability of the aircraft, as illustrated in FIG. 4b. The dotted line represents the residual strength of FIGS. 3a, 3b, and 4a, and the solid line represents a less-strong structure due to lighter structure. In order to maintain the safety margin, at some predetermined points along the life of the aircraft, the allowable loading is reduced below the previously set limit load, thereby creating a reduced envelope that prevents the aircraft from operating in some extremes that were determined earlier as the original flight envelope. The missions that the aircraft performs during this reduced life period must be compatible with the limit load, or technologies that reduce the loading must be engaged, such that the aircraft continues a safe flight.

Figure 5:
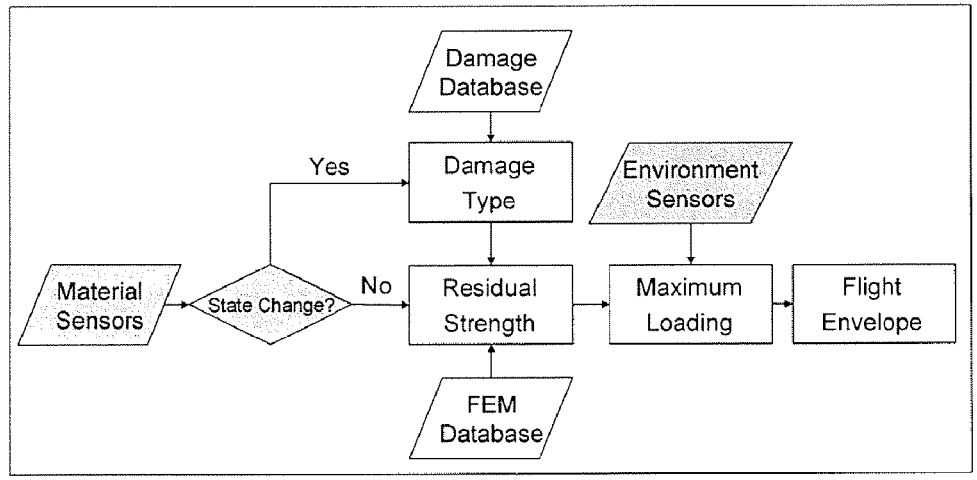
FIG. 5 illustrates a flow chart for a control system process for determining a flight envelope by using an aircraft health and damage monitoring system according to a preferred embodiment of the present invention.

Referring to FIG. 5, in a preferred embodiment of the present invention, a process by which the flight envelope is determined is shown. Two types of onboard aircraft sensors provide data on the structural health (material sensors) and outside environment (environment sensors).

At regular intervals, or after events that are determined by the flight control system, the material sensors detect the state of the material and determine if there has been a state change. If no state change has occurred, the residual strength remains unchanged since the last polling change. If there has been a state change, such as a fatigue crack that has been detected, then the material sensor data is compared to a database of sensor data linked to various damage types and locations (i.e., damage database) to determine the size and location of the damage (i.e., damage type).

The damage type is compared to a database linked to the structural model (e.g., Finite Element Model) of the component or area where the damage occurred to determine a new residual strength of the component due to the current material health state as detected by the material sensors. This residual strength is used to determine the maximum loading attainable due to the damaged component (i.e., maximum loading).

The environment sensors are used to determine the loading that is currently being input into the structure, as well as the environmental parameters that affect the materials and loading such as temperature, humidity, gusting etc. This allows the maximum loading attainable by the structure to establish the variable flight envelope. The flight envelope can be updated at intervals defined by the frequency for which sensor data is measured and the control system's ability to translate that data through the aforementioned process into a flight envelope.

After determinations of the damage type and residual strength are made, the system may determine that a maintenance action should be taken. The determination of the maintenance action depends upon the type of damage and/or the severity of the damage, as shown by the reduction in the residual strength of the aircraft. Specific examples of maintenance action types include the following: increased monitoring; standard non-destructive evaluation at next aircraft landing; repair of damaged component; and replacement of damaged component. In making a determination, the system compares the processed data relating to the damaged component with forecasted data from existing Health and Usage Monitoring Systems (HUMS) or predicted aircraft usage data based on the aircraft design. When the system determines that a particular maintenance action should be taken, the maintenance action can be logged within the system for download by a technician, or it can be sent directly to the pilot as a notification, or it can be transmitted to a ground station in preparation for physical aircraft maintenance, or any combination thereof.

Figure 6:
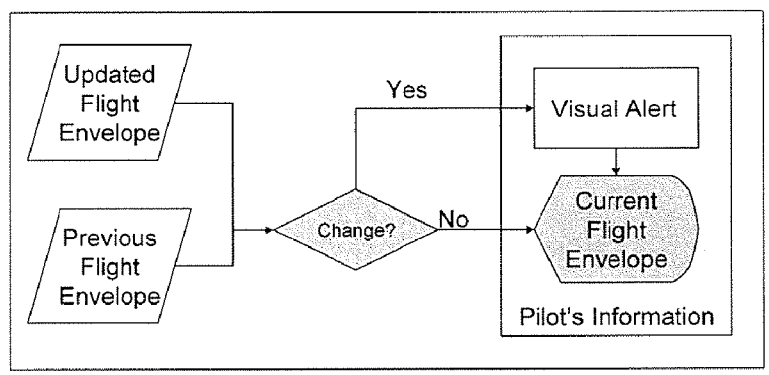
FIG. 6 illustrates a flow chart for an alert process for variable flight envelopes employed by an aircraft health and damage monitoring system according to a preferred embodiment of the present invention.

In order for the system to permit safe flight in a variable flight envelope, a flight control system must be able to either alert the pilot of or enforce reductions in the new flight envelope. Referring to FIG. 6, a process by which a flight envelope change is processed and the pilot alerted is illustrated. The pilot must see how the flight envelope has changed and be able to determine the new aircraft flight abilities. This can be done through a variety of methods not covered by this process, but would potentially include training, graphics that depict current position in a flight envelope through flight, or visual or audible alerts when the aircraft performance nears a flight envelope. Reduced flight envelopes must allow for safe capability for flight, as discussed in the previous section.

Figure 7:
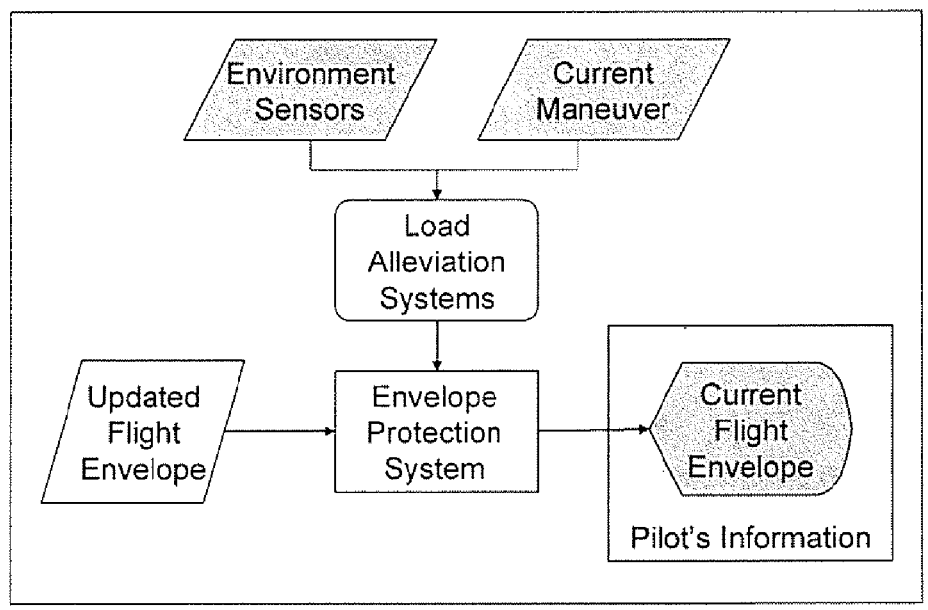
FIG. 7 illustrates a flow chart for an active control process for variable flight envelopes employed by an aircraft health and damage monitoring system according to a preferred embodiment of the present invention.

Referring to FIG. 7, the flight envelope can also be enforced by the flight control system, as shown. Existing systems such as gust or other load alleviation through control surfaces can be integrated into the environment sensors, with knowledge of the current maneuver to protect the flight envelope as it changes. This protection is performed outside the pilot input, such that the pilot is aware of the current flight envelope of the structure. As the flight envelope changes, the pilot is aware of the updated flight envelope, but the maneuvers that the pilot performs are automatically checked by the flight controller to ensure safe flight.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. A monitor system for determining a residual strength of an aircraft, the aircraft comprising a plurality of panels, and the system comprising:
   a plurality of sensors mounted on a first panel; and
   a microprocessor in communication with each of the plurality of sensors,
   wherein each of the plurality of sensors is configured to detect time domain data, frequency domain data, and energy domain data, and to transmit the detected time domain data, frequency domain data, and energy domain data to the microprocessor, and
   wherein the microprocessor is configured to process the detected time domain data, frequency domain data, and energy domain data and, when the first panel has been damaged, to use the processed data to determine (i) an approximate size of the damage and (ii) an approximate location of the damage, and to use the two determinations to further determine (i) an aircraft residual strength and (ii) a flight loading for which the determined aircraft residual strength allows
   further comprising a flight control subsystem, the flight control subsystem being in communication with the microprocessor, wherein the microprocessor is further configured to communicate the processed data to the flight control subsystem, and wherein the flight control subsystem is configured to use the received data to limit maneuverability of the aircraft.

2. The monitor system of claim 1, wherein the microprocessor is further configured to use the processed data to determine that a specific maintenance action should be taken to address the damage.

3. The monitor system of claim 1, wherein each of the plurality of sensors is further configured to emit an acoustic wave signal and to receive a wave return signal corresponding to the emitted signal, and to measure an amplitude, a frequency, and a phase of the received wave return signal.

4. The monitor system of claim 3, wherein the microprocessor is further configured to process the detected data by using at least one of a guided wave (GW) method, an acoustic emission (AE) method, and a frequency response (FR) method.

5. The monitor system of claim 3, wherein for each of the plurality of sensors, the detected time domain data includes a set of measurements of differences between a time at which each acoustic wave signal is emitted and a time at which each respective corresponding wave return signal is received.

6. The monitor system of claim 3, wherein for each of the plurality of sensors, the detected frequency domain data includes at least one of a data set selected from the group consisting of (i) a set of measurements of frequency shifts between a frequency at which each acoustic wave signal is emitted and a frequency at which each respective corresponding wave return signal is received, (ii) a phase at which each acoustic wave signal is emitted and a phase at which each respective corresponding wave return signal is received, and (iii) a power spectral density data set.

7. The monitor system of claim 3, wherein for each of the plurality of sensors, the detected energy domain data includes at least one of a data set selected from the group consisting of (i) a set of measurements of amplitude shifts between an amplitude at which each acoustic wave signal is emitted and an amplitude at which each respective corresponding wave return signal is received, (ii) a mean amplitude shift, and (iii) a standard deviation of amplitude shift.

8. The monitor system of claim 1, wherein the microprocessor is further configured to store a baseline data set, the baseline data set including sensor data obtained when the first panel included no damage, and wherein the microprocessor is further configured to determine that the first panel has been damaged when an average difference between newly received data and baseline data exceeds a first predetermined threshold.

9. The monitor system of claim 8, wherein, when the microprocessor determines that the first panel has been damaged, the microprocessor is further configured to determine an approximate size of the damage and an approximate location of the damage by using at least one algorithm selected from the group consisting of a balanced one-way Analysis of Variances (ANOVA) algorithm, a Principal Components Analysis (PCA) algorithm, and a Pattern Recognition (PR) algorithm.

10. The monitor system of claim 9, wherein the microprocessor is further configured to use a K-Nearest Neighbor (KNN) pattern recognition algorithm.

11. The monitor system of claim 1, wherein the first panel includes at least one sensor per three square feet of first panel surface area.

12. A method for determining a residual strength of an aircraft, the aircraft comprising a plurality of panels, each of the plurality of panels having a plurality of sensors mounted thereon, and the method comprising the steps of:
   using each of the plurality of sensors to detect time domain data, frequency domain data, and energy domain data;

transmitting the detected time domain data, frequency domain data, and energy domain data to a microprocessor;

using the microprocessor to process the detected time domain data, frequency domain data, and energy domain data;

when a panel has been damaged, using the processed data to determine (i) an approximate size of the damage and (ii) an approximate location of the damage;

using the two determinations to further determine (i) an aircraft residual strength and (ii) a flight loading for which the determined aircraft residual strength allows; and using the processed data to limit a maneuverability of the aircraft.

13. The method of claim 12, further comprising the step of using the processed data to determine that a specific maintenance action should be taken to address the damage.

14. The method of claim 12, wherein the step of using each of the plurality of sensors to detect time domain data, frequency domain data, and energy domain data further comprises using each of the plurality of sensors to emit an acoustic wave signal and to receive a wave return signal corresponding to the emitted signal, and to measure an amplitude, a frequency, and a phase of the received wave return signal.

15. The method of claim 14, wherein the step of using the microprocessor to process the detected data further comprises using at least one of a guided wave (GW) method, an acoustic emission (AE) method, and a frequency response (FR) method.

16. The method of claim 14, wherein for each of the plurality of sensors, the detected time domain data includes a set of measurements of differences between a time at which each acoustic wave signal is emitted and a time at which each respective corresponding wave return signal is received.

17. The method of claim 14, wherein for each of the plurality of sensors, the detected frequency domain data includes at least one of a data set selected from the group consisting of (i) a set of measurements of frequency shifts between a frequency at which each acoustic wave signal is emitted and a frequency at which each respective corresponding wave return signal is received, (ii) a phase at which each acoustic wave signal is emitted and a phase at which each respective corresponding wave return signal is received, and (iii) a power spectral density data set.

18. The method of claim 14, wherein for each of the plurality of sensors, the detected energy domain data includes at least one of a data set selected from the group consisting of (i) a set of measurements of amplitude shifts between an amplitude at which each acoustic wave signal is emitted and an amplitude at which each respective corresponding wave return signal is received, (ii) a mean amplitude shift, and (iii) a standard deviation of amplitude shift.

19. The method of claim 12, further comprising the steps of using the microprocessor to store a baseline data set for each panel, the baseline data set including sensor data obtained when the respective panel included no damage, and using the microprocessor to determine that the respective panel has been damaged when an average difference between newly received data and baseline data exceeds a first predetermined threshold.

20. The method of claim 19, wherein when the microprocessor determines that the respective panel has been damaged, the step of using the microprocessor to determine an approximate size of the damage and an approximate location of the damage further comprises using at least one algorithm selected from the group consisting of a balanced one-way Analysis of Variances (ANOVA) algorithm, a Principal Components Analysis (PCA) algorithm, and a Pattern Recognition (PR) algorithm.

21. The method of claim 20, further comprising the step of using a K-Nearest Neighbor (KNN) pattern recognition algorithm.

22. The method of claim 12, wherein each panel includes at least one sensor per three square feet of panel surface area.

* * * * *